United States Patent [19] [11] B 3,998,839
Seha [45] Dec. 21, 1976

[54] PROCESS FOR THE PREPARATION OF METAL-FREE PHTHALOCYANINE

[75] Inventor: Zdenek Seha, Basel, Switzerland

[73] Assignee: Ciba-Geigy Corporation, Ardsley, N.Y.

[22] Filed: Dec. 19, 1973

[21] Appl. No.: 426,266

[44] Published under the second Trial Voluntary Protest Program on March 2, 1976 as document No. B 426,266.

[30] Foreign Application Priority Data

Dec. 28, 1972 Switzerland .................... 19002/72

[52] U.S. Cl. ............................................. 260/314.5
[51] Int. Cl.$^2$ ........................................ C09B 47/08
[58] Field of Search .................................. 260/314.5

[56] References Cited

UNITED STATES PATENTS

| | | | |
|---|---|---|---|
| 2,699,441 | 1/1955 | Wittstein | 260/314.5 |
| 3,060,189 | 10/1962 | Stocker et al. | 260/314.5 |

*Primary Examiner*—Harry I. Moatz
*Attorney, Agent, or Firm*—Vincent J. Cavalieri

[57] ABSTRACT

Process for the preparation of metal-free phthalocyanine, wherein 4 moles of phthalonitrile are reacted with 0.05 to 0.3 mole of anhydrous alkali sulphide in an inert organic solvent having a boiling point higher than 130° C, in the presence of 0.5 to 3 equivalents of an alcohol having a boiling point higher than 130° C, at temperatures of between 100° C and the boiling point of the solvent and alcohol, respectively.

5 Claims, No Drawings

PROCESS FOR THE PREPARATION OF METAL-FREE PHTHALOCYANINE

The present invention relates to a process for the preparation of metal-free phthalocyanine.

The procedure is known for the preparation of mixtures of alkali phthalocyanines and metal-free phthalocyanine by reaction of phthalonitrile with anhydrous alkali sulphides at elevated temperatures, whereby the minimum amount of alkali sulphide is given as being 0.5 mole to 4 moles of phthalonitrile. The metal-free phthalocyanine can then be obtained from the reaction mixture by an additional purification operation under hydrolysing conditions.

It has now been found that metal-free phthalocyanine is obtained direct from the reaction of phthalonitrile with anhydrous alkali sulphides by the reaction of 4 moles of phthalonitrile with 0.05 to 0.3 mole of anhydrous alkali sulphide in an inert organic solvent having a boiling point higher than 130°C, in the presence of 0.5 to 3 equivalents of an alcohol having a boiling point higher than 130°C, at temperatures of between 100°C and the boiling point of the solvent and alcohol, respectively.

With use of the process according to the invention, the second stage of the above process entailing hydrolysis of alkali phthalocyanine, hitherto required in the preparation of metal-free phthaloocyanine, proves to be unnecessary, a factor which constitutes an appreciable advantage. In the case of the hitherto known procedure for the single-stage preparation of metal-free phthalocyanine from phthalonitrile in the presence of hydrogen, the reaction has had to be performed in a closed system under pressure and at temperatures of above 150°C. The low consumption of alkali sulphide in the present process is, moreover, of particular value from an ecological point of view; and, furthermore, the yield is increased compared with that obtained by the known process.

The possibility of obtaining metal-free phthalocyanine direct by a reduction of the amount of alkali sulphide was not to be anticipated on the basis of the known process, and the disclosure thereof can therefore be considered surprising.

The procedure for the technical performance of the process according to the invention can, for example, be as follows:

A mixture of phthalonitrile and alkali sulphide is heated with the inert organic solvent, and the alcohol then gradually added. After completion of the reaction, the formed, metal-free phthalocyanine is separated, washed and dried.

By the designation 'phthalonitrile' is meant here o-phthalic acid dinitrile; while a suitable anhydrous alkali sulphide is a compound at least 90% pure of the formula $A_2S_n$, wherein A represents an alkali metal, particularly sodium, but also potassium or lithium, and n denotes an integer, preferably 1 or 4.

Inert organic solvents having a boiling point higher than 130°C which can be employed are, in particular, aromatic hydrocarbons that are optionally halogenated, such as, for example, xylene, chlorobenzene, o-dichlorobenzene or 1,2,4-trichlorobenzene. Also formamide or dimethylformamide is suitable as solvent.

Alcohols having a boiling point higher than 130°C, preferably up to 250°C, which are applicable for the process according to the invention are, for example, n-octanol, ethylene glycol, propylene glycol or diethylene glycol, whereby the reaction is performed in the presence preferably of two equivalents of the alcohol.

The resulting metal-free phthalocyanine, preferably in a finely dispersed form, is suitable for use as pigment, e.g. for lacquers, or for incorporation into synthetic resins or synthetic fibres.

EXAMPLE 1

512.4 g of o-phthalodinitrile and 15 g of powdered anhydrous 94.8% sodium sulphide are placed into 800 g of o-dichlorobenzene. The reaction mixture is heated, with stirring, to 140°–145°C, and 76.1 g of 1,2-propylene glycol uniformly added in the course of 3 hours at 140°–150°C. Stirring is subsequently maintained for 3 hours at 145°C. After cooling to 80°C, the suspension is filtered off under suction, and the residue washed with o-dichlorobenzene, methanol, and hot water. It is dried in vacuo at 100°–110°C to obtain 445 g of a pure, metal-free phthalocyanine of the β-form, corresponding to a yield of 86.5% of theory.

EXAMPLES 2–4

If, instead of 1,2-propylene glycol according to Example 1, there is used 62.07 g of ethylene glycol or 106.1 g of diethylene glycol or 260 g of n-octanol, then practically the same good yields of metal-free phthalocyanine are obtained.

EXAMPLES 5–8

If a different solvent is used in place of o-dichlorobenzene according to Example 1, then the yields listed in the following table are obtained at the stated temperatures:

Table

| Solvent | Reaction temperature (°C) | Yield (% of theory) |
| --- | --- | --- |
| 1,2,4-trichlorobenzene | 187 | 82.1 |
| chlorobenzene | 132 | 76.5 |
| xylene (isomer mixture) | 135 | 82.6 |
| dimethylformamide | 138 | 78.0 |

What we claim is:

1. A one-step process for the preparation of metal-free phthalocyanine consisting essentially of reacting phthalonitrile with anhydrous alkali sulfide in an inert organic solvent having a boiling point higher than 130°C, in the presence of 0.5 to 3 equivalents of an alcohol having a boiling point higher than 130°C, at a temperature of between 100°C and the boiling point of the solvent and alcohol, wherein said reactants are in the ratio of 4 moles of phthalonitrile to 0.05–0.3 moles of alkali sulfide.

2. Process according to claim 1, wherein anhydrous sodium sulphide is used.

3. Process according to claim 1, wherein an inert organic solvent having a boiling point of between 130°C and 250°C is used.

4. Process according to claim 1, wherein the inert organic solvent used is o-dichlorobenzene.

5. Process according to claim 1, wherein the alcohol used is n-octanol, ethylene glycol, propylene glycol or diethylene glycol.

* * * * *